United States Patent [19]

Schellberg et al.

[11] Patent Number: 4,468,780

[45] Date of Patent: Aug. 28, 1984

[54] METHOD OF LINING A STEEL-MAKING FURNACE

[75] Inventors: Franz Schellberg, Sèvres; Bernard Kauffeisen, Louveciennes, both of France; Manfred Oberbach; Gerhard Zingel, both of Krefeld, Fed. Rep. of Germany; Günter Wieland, Wiesbaden, Fed. Rep. of Germany

[73] Assignee: Didier-Werke A.G., Wiesbaden, Fed. Rep. of Germany

[21] Appl. No.: 411,476

[22] Filed: Aug. 25, 1982

[30] Foreign Application Priority Data

Aug. 25, 1981 [DE] Fed. Rep. of Germany ....... 3133572

[51] Int. Cl.³ .......................... F27D 1/12; F27D 1/16
[52] U.S. Cl. ........................................ 373/75; 373/76
[58] Field of Search ................ 373/75, 76, 72; 432/4, 432/248; 264/30; 266/280, 284

[56] References Cited

U.S. PATENT DOCUMENTS

| | | | |
|---|---|---|---|
| 3,804,969 | 4/1974 | Treilhard | 373/75 |
| 4,102,694 | 7/1978 | Sasaki et al. | 264/30 |
| 4,119,792 | 10/1978 | Elsner et al. | 373/76 |
| 4,259,539 | 3/1981 | Elsner et al. | 373/76 |
| 4,275,258 | 6/1981 | Harmsen et al. | 373/76 |

FOREIGN PATENT DOCUMENTS 2037412 7/1980 United Kingdom ................ 373/76

*Primary Examiner*—Roy N. Envall, Jr.
*Attorney, Agent, or Firm*—Wenderoth, Lind & Ponack

[57] ABSTRACT

Method of lining a steel-making furnace which comprises lining the bottom area of the furnace with bricks to form a first lining, lining at least a portion of the wall area of the furnace with bricks and/or a water cooling box to form a second lining, lining the first lining and a lower portion of the second lining with a first refractory material, applying a second refractory material to an upper portion of the second lining above the lower portion before heating the furnace, and then heating the second refractory material to cause hardening thereof. The second refractory material comprises magnesium oxide, green chromium oxide, clay, a phosphate, a bisulfate and water. The use of this composition for the second refractory material results in a substantial increase in the durability of the furnace lining.

38 Claims, 4 Drawing Figures

METHOD OF LINING A STEEL-MAKING FURNACE

BACKGROUND OF THE INVENTION

The present invention relates to a method of lining a steel-making furnace, with special emphasis on those areas of the furnace which are subjected to heavy wear during operation of the furnace. The invention also relates to a furnace lined by this method.

Up to now, the wall area of electric steel-making furnaces was lined with a layer of regular bricks, for example, magnesium oxide bricks, and then an overlayer of carbon-containing bricks, particularly, tar-containing magnesium oxide and/or dolomite bricks. The bottom area of the electric furnace was lined with a safety layer of magnesium oxide bricks, and a refractory material was placed over this safety layer and also the carbon-containing bricks in the lower portion of the wall area. FIG. 4 of the drawings shows this construction of a conventional lining for an electric steel-making furnace. It also shows the steel bath level and the area of the wall which is subjected to particularly heavy wear, as will be discussed in more detail later on. In the case of such conventional electric steel-making furnace linings, it has been necessary to frequently repair those areas of the wall which are subjected to heavy wear, sometimes after each melting process.

In such a melting process, in an electric furnace of medium capacity, at the beginning of the melting process scrap iron is placed in the furnace with a scrap-iron basket, the electrodes are lowered onto the scrap iron, and the scrap iron is melted. The melting time is on the order of 30 minutes. Then, a second batch of scrap iron is placed in the furnace, and melted in about 30 minutes. Finally, a third batch of scrap iron is placed in the furnace, and melted in 30 minutes, giving a total melting time for all three batches of about 90 minutes. When the capacity of the furnace has been reached, in this case after melting three batches of scrap iron, the metallurgical work is finished, leaving only the required analyses. After the analyses have been completed, tapping takes place.

U.S. Pat. No. 3,832,478 discloses a method of avoiding premature wear of the critical areas of steel-making furnaces, particularly electric furnaces, by spraying a composition onto the hot faces of the bricks lining the furnace before operating the furnace. The patent indicates that a mixture of magnesia and dolomite may be sprayed over the critical wear areas. However, it is first necessary to heat up the critical wall areas. Furthermore, it is necessary to encase each of the bricks in the critical areas in a steel sheet projecting outward from the hot faces of the bricks, to serve as receptacles and anchors to retain the spraying composition.

U.S. Pat. No. 3,994,676 discloses a method of protecting critical wear areas in the lining of a basic oxygen furnace. In this method, tie rods are mounted on the bricks, to hold a grid, onto which a composition is sprayed. The patent indicates that pulverulent magnesia, magnesite or dolomite, in the form of a sprayable slurry may be used in protecting the critical wear areas.

*Industrial Heating*, Vol. 30, 1963, pages 1120–1126 discloses spraying compositions which are based on periclase and bonded with sodium phosphates. If necessary, the composition may also contain clay, for example, bentonite, as a plastifying agent. This publication indicates that the compositions can be sprayed onto either hot or cold surfaces, but does not provide any information concerning its use with electric furnaces, or any information concerning special conditions which must be observed.

German patent publication 1,571,608 discloses compositions containing sodium phosphate as bonding agent, for spraying onto areas of heavy use. The components of the composition must have a very specific grain size. Bentonite, in an amount of up to 2%, can be used as a plastifying agent. However, after the composition is sprayed onto the cold surfaces, the surfaces must be heated slightly, and slowly.

SUMMARY OF THE INVENTION

The object of the present invention is to produce a lining for a steel-making furnace, with emphasis on the heavy wear areas of the furnace, without the disadvantages of previously known lining methods, especially, frequently required repairs, in particular repairs in the heavy wear areas after each tapping.

It is also an object of the invention to shorten the time which has been necessary to line a furnace using previously known methods.

In accordance with the present invention, these objects are achieved by a method which comprises lining the bottom area of the furnace with bricks to form a first lining; lining at least a portion of the wall area of the furnace with bricks and/or a water cooling box to form a second lining; lining the first lining and the lower portion of the second lining with a first refractory material; applying a second refractory material to a substantially clean upper portion of the second lining above the lower portion of the second lining before heating the furnace, and then heating the second refractory material to harden it.

DETAILED DESCRIPTION OF THE INVENTION

Figure 1:
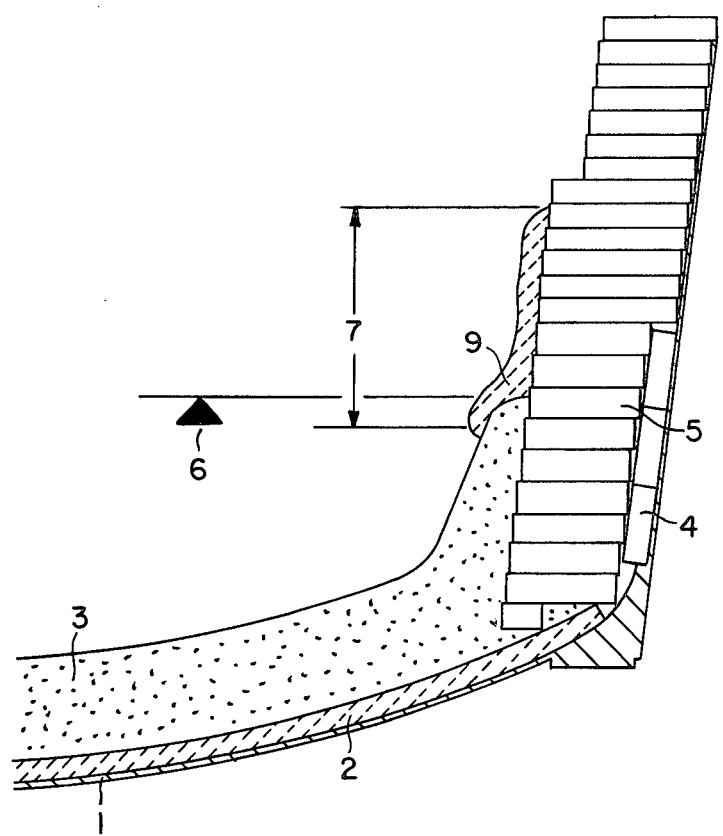
FIGS. 1–3 are cross-sectional views of a portion of an electric steel-making furnace, lined in accordance with the present invention.

The second refractory material, which can be sprayed or troweled onto the heavy wear areas, comprises 100 parts by weight of magnesium oxide, 0.5 to 5 parts by weight of green chromium oxide, 0.5 to 3 parts by weight of clay, 0.5 to 3 parts by weight, in total, of at least one member selected from the group consisting of an alkali metal metaphosphate and an alkali metal polyphosphate, 0.2 to 1.5 parts by weight of an alkali metal bisulfate, and 8 to 10 parts by weight of water.

After application of this second refractory material, it is not necessary to first dry the composition by slowly heating it, to carefully remove all the water, as is the case with previous methods. Rather, hardening can take place through use of the furnace immediately after application of the second refractory material. Thus, following application of the second refractory material, to the cold surfaces of the furnace lining, it is possible to immediately place scrap iron in the furnace, lower the electrodes, and begin the steel-melting process. However, in this regard, it is important to apply the second refractory material to a substantially clean portion of the lining, for example, when the lining is new, or cleaned to remove metallurgic slag.

Magnesium oxide is the main component of the second refractory material. Preferably, it is a magnesium oxide containing at least 96% by weight of MgO, such as a salt water magnesium sinter or a magnesite sinter. It is also preferred that the magnesium oxide have a high C/S (carbon/sulfur) ratio, of at least 1.5, more preferably, more than 2.

The second refractory material also contains 0.5 to 5.0 parts by weight of green chromium oxide, preferably 1 to 3 parts by weight. Preferably, this green chromium oxide ($Cr_2O_3$) has a grain size below 0.063 mm, giving it the consistency of flour.

The composition also contains 0.5 to 3 parts by weight of clay, preferably bentonite, which serves as a plastifying agent, giving the composition pliability for application by spraying or troweling. Preferably, the clay has an $Al_2O_3$ content of 30 to 40% by weight.

As bonding agent, the composition contains 0.5 to 3 parts by weight of an alkali metaphosphate or alkali polyphosphate. Preferably, the amount of this bonding agent is 1 to 2 parts by weight. These amounts refer to the content of solid phosphates in the composition.

The composition also contains 0.2 to 1.5 parts by weight of an alkali metal bisulfate, preferably sodium bisulfate, which promotes improved processability and adherence to the furnace lining, as well as better sintering and layering of the lining.

In producing the second refractory material, all of the solid constituents are thoroughly mixed in a mixer. If the composition is to be sprayed on the lining, this can be done with a standard spraying apparatus, wherein it is preferable to add the water, in an amount of 8 to 10 parts by weight, separately at the head of the spraying apparatus, that is, the nozzle. The resultant mixture of water and solid components is then sprayed on the lining. On the other hand, if the composition is to be applied with a trowel, the water can be either added to the composition along with the solid components, or the water can be added to a previously produced mixture of the solid components. The mixture can then be applied in a known manner with a trowel.

The solid components of the second refractory material preferably have a maximum grain size of not greater than about 6 mm, more preferably, not greater than about 4 mm. For a maximum grain size of not greater than 6 mm, a preferred grain distribution is as follows:

| mm | % by weight |
| --- | --- |
| 3–6 | 16–22 |
| 1 to <3 | 20–26 |
| 0.09 to <1 | 25–30 |
| <0.09 | 28–33 |

The alkali metal metaphosphate and alkali metal polyphosphate used in the second refractory material are preferably sodium or potassium compounds, more preferably sodium compounds. It is also preferred that the alkali metal metaphosphate has a $P_2O_5$ content of about 69%, and that the alkali metal polyphosphate have a polymerization degree (n) of at least 3, more preferably 4 to 30. In general, the phosphates are added in the form of a finely ground powder.

In a preferred embodiment of the present invention, the second refractory material is not only sprayed onto those areas of the lining which are subjected to heavy wear, but also onto that area of the tapping spout and pouring nozzle which experience heavy wear. In this latter instance the composition can be applied by spraying or troweling or ramming it into the spout or nozzle with a steel pipe with the aid of a template.

In the method of the present invention, the first lining, formed on the bottom area of the furnace, is a safety layer. Preferably, this lining is constructed of bauxite bricks and a cement, rich in alumina, which also contains a phosphate, e.g. monoaluminum phosphate or sodium polyphosphate as bonding agent. This safety layer, which has a high resistance to infiltration by molten metal during use of the furnace, has the advantage that it can be made of only one course of bricks, as opposed to the traditional safety layer of several courses of magnesium oxide bricks.

The second lining can be formed by lining a portion of the wall area with dolomite bricks or bricks of carbon-containing magnesium oxide as mentioned above. It is also possible to use a water cooling box in forming the second lining, in which case the box preferably extends down the wall area to the first lining, in a manner which will become more apparent from the detailed description set forth below in connection with the drawings.

In another embodiment of the invention, the second lining is formed by lining a portion of the wall area with magnesium oxide bricks, and then lining the magnesium oxide bricks and another portion of the wall area with the dolomite bricks or bricks of carbon-containing magnesium oxide.

Preferably, the second refractory material is applied to the lining of the furnace in an amount which results in a thickness of 30 to 100 mm on a dry basis, i.e. this being the thickness of the hardened or cured composition. More preferably, this thickness is 40 to 60 mm.

It also preferred that the second refractory material is applied to the lining in a manner such as to overlap the upper portion of the first refractory material, as will become more apparent from the description of the drawings set forth below.

FIG. 1 shows a vertical, partial cross-section of an electric steel-making furnace having bottom 1 with a first lining 2 (safety layer) thereon. The safety layer is made of bauxite bricks cemented together with an alumina-rich cement, bonded with a phosphate. First refractory material 3 consisting of a standard, dry magnesium oxide material, is placed on safety layer 2, and is then hardened by vibrating it. The first refractory material 3 extends upward over the lower part of inner lining 5 to form a sloped area of material 3. Brick lining 4 of magnesium oxide bricks, and inner lining 5 of tar-soaked magnesium oxide bricks having a low iron content, line the wall area.

When the furnace is operating at full capacity, at bath level 6, area 7 is that portion of the lining which is subjected to the heaviest wear. This area 7 extends from just below bath level 6 to well above bath level 6. In accordance with the present invention, second refractory material 9 is applied over the lining in area 7.

Brick lining 4 can be omitted, if desired, because of the protection afforded by second refractory material 9. Furthermore, it is also possible to reduce the inner lining 5 by the thickness of brick lining 4.

Figure 2:
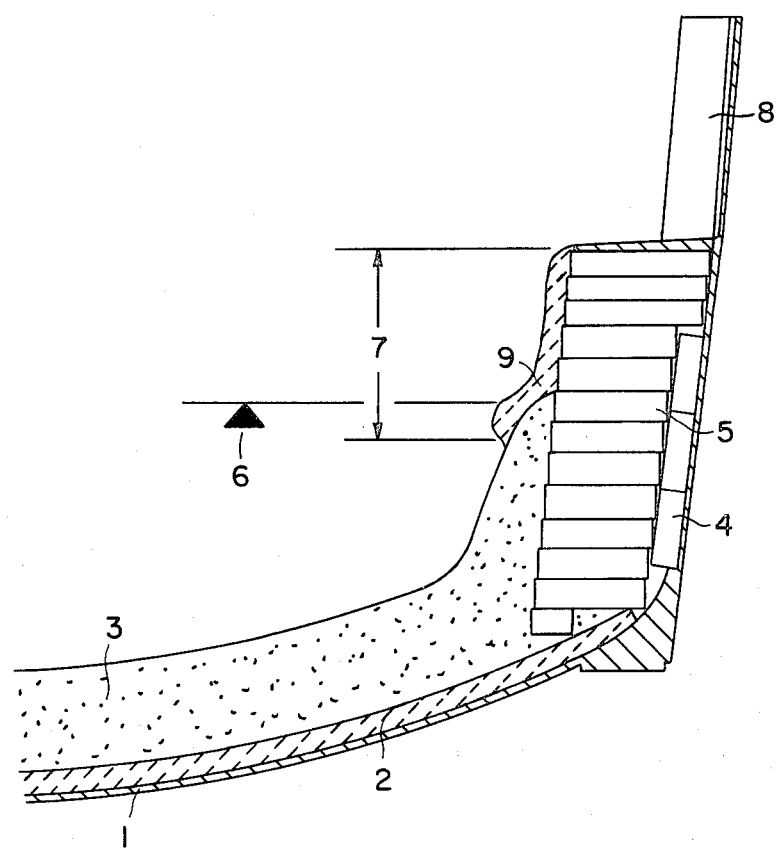
Figure 3:
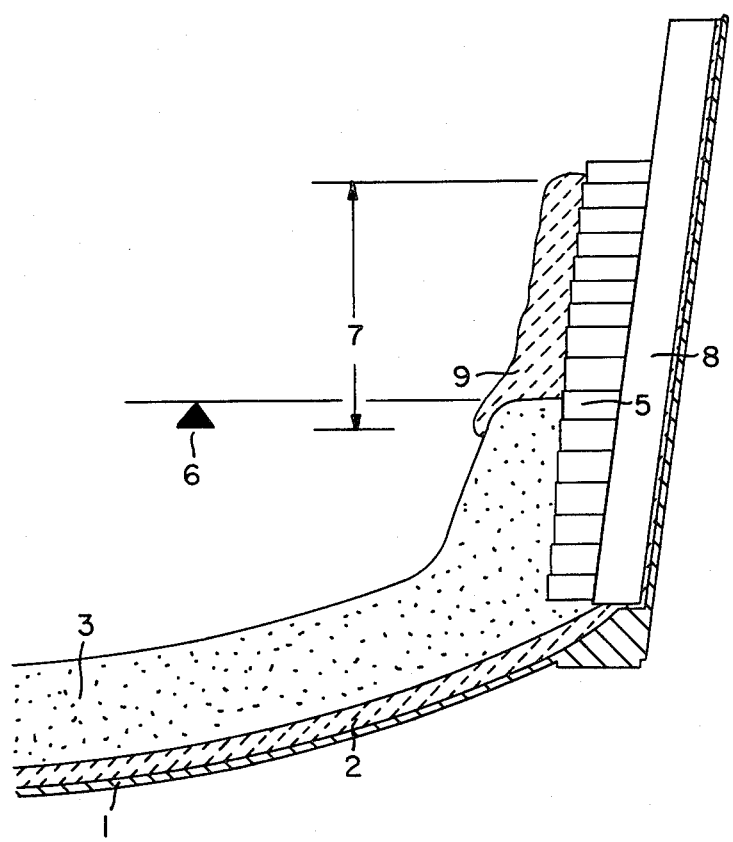
Figure 4:
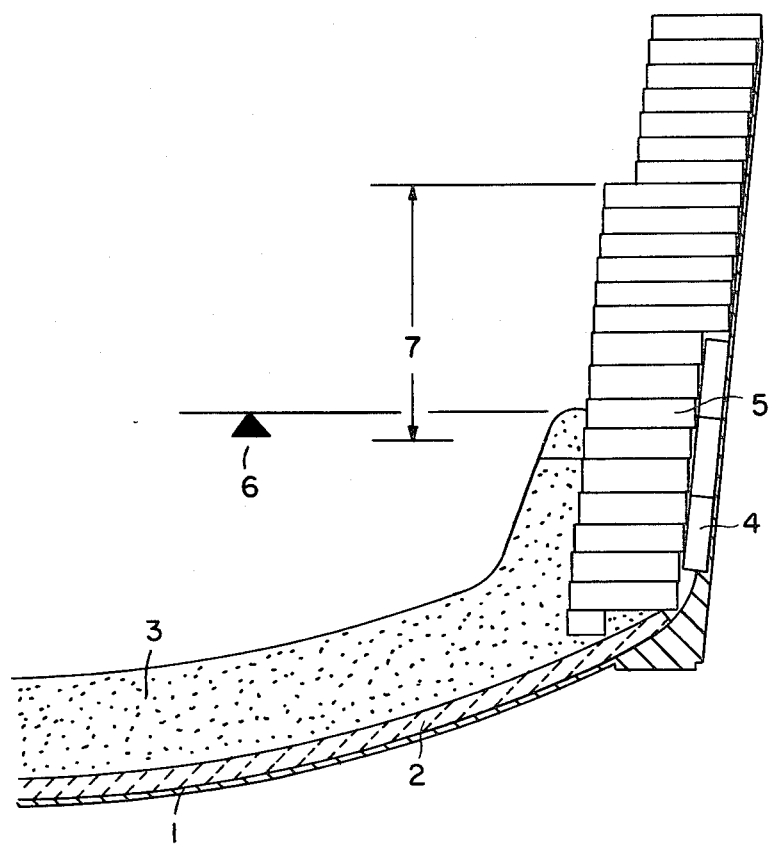
FIG. 4 is a cross-sectional view of an electric steel-making furnace lined in accordance with a previously known method.

FIGS. 2 and 3 show the use of water cooling box 8. Box 8 can be positioned above area 7, as shown in FIG. 2, or it can extend all the way down between inner lining 5 and the wall of the furnace, to safety layer 2 as shown in FIG. 3. In this latter instance, i.e. as shown in FIG. 3, brick lining 4 can be omitted and inner lining 5 can be reduced in thickness, as a result of using water cooling box 8. Furthermore, if necessary, it is even possible to entirely omit both brick lining 4 and inner lining 5, in which case water cooling box 8 is covered by second refractory material 9 in wear area 7.

EXAMPLE

The following composition for use as the second refractory material, is prepared. The amounts indicated are in % by weight unless otherwise indicated.

| Magnesium oxide sinter (MgO 96%; CaO 2.5%; SiO$_2$ 0.9%) | |
|---|---|
| 3.5–5.5 mm | 15% |
| 1.5–3.5 mm | 25% |
| 0.1–1.6 mm | 35% |
| <0.09 mm | 25% |
| Chromium oxide, green, <0.063 mm | 2% |
| Clay (38% Al$_2$O$_3$) | 2% |
| Sodium metaphosphate (approximately 69% P$_2$O$_5$) | 2% |
| Sodium bisulfate | 0.4% |
| Added water | 8 to 10 parts by weight |

This composition was applied, in a thickness of 50 mm to a cold inner lining 5 of a 45 ton electric steel-making furnace of the type shown in FIG. 1, i.e. without a water cooling box. Immediately thereafter, a first batch of scrap iron was charged into the furnace, the electrodes were lowered, and the steel was melted. A second batch of scrap iron was charged into the furnace and melted, completing the metallurgic work. Seven batches of scrap iron per day were melted down in this furnace. The useful life of the furnace was 380 batches, without there being any necessity for interim repairs by applying the above composition. In contrast, the useful life of the same furnace without second refractory material 9 of the above composition was only 200 batches, and, in addition, it was necessary to conduct frequent repairs and application of prior art spraying compositions during the processing of these 200 batches.

Furthermore, in this example, the durability of the furnace cap, made of bauxite bricks, was increased from 195 to 300 batches through the reduction of the alkali concentration in the furnace atmosphere.

Another test was conducted on a 60 ton electric steel-making furnace, which was equipped with water cooling boxes and was designed to melt down 14 batches of scrap iron per day. Lining the furnace in accordance with the present invention resulted in an increase of 50% in the useful life of the furnace. Only a small amount of additional intermediate spraying was required. Also, during another test with the same furnace, it was possible to reduce the wall thickness of the furnace from the original thickness of 450 mm to 350 mm, and still maintain the same durability for the furnace lining.

As indicated above, using prior art compositions for repairing damage to the furnace lining in wear area 7 is not nearly as effective as using the second refractory material as defined in the present invention. Thus, prior to the present invention, for repairing the inner lining in wear area 7, use was made of a magnesite compound with a silicate bonding agent, which composition was applied, while hot, by spraying or casting it on the inner lining. However, this had the disadvantage that high amounts of alkali, derived from this composition, entered the furnace lining. Such high amounts of alkali not only diffuse into the bricks lining the wall area to cause the rear area of the bricks to become brittle due to the high alkali concentration, but it also heavily corrodes the furnace cap and/or those bricks in the cap with a high alumina content, through alkali bursting. Because of the frequent repair work and/or patching of the protective layer of the prior art composition, 3 to 9 kg of the composition were needed for each ton of steel, meaning that high amounts of alkali, particularly sodium, entered the furnace. In contrast, only about 0.2 to 0.6 kg of the composition (second refractory material) used in the present invention is needed for each ton of steel produced. This means that, on the basis of the alkali concentration in the furnace atmosphere, the present invention results in only 5 to 10% of the alkali concentration occuring with the use of the prior art composition containing a magnesite compound with silicate bonding agent. The benefit of the present invention can therefore be clearly appreciated.

We claim:

1. A method of lining a steel-making furnace having a wall area and a bottom area, which comprises:
   lining said bottom area with bricks to form a first lining;
   lining at least a portion of said wall area with at least one member selected from the group consisting of bricks and a water cooling box to form a second lining;
   lining said first lining and a lower portion of said second lining with a first refractory material;
   applying a second refractory material to a substantially clean upper portion of said second lining above said lower portion before heating said furnace, said second refractory material comprising 100 parts by weight of magnesium oxide, 0.5 to 5 parts by weight of green chromium oxide, 0.5 to 3 parts by weight of clay, 0.5 to 3 parts by weight, in total, of at least one member selected from the group consisting of an alkali metal metaphosphate and an alkali metal polyphosphate, 0.2 to 1.5 parts by weight of an alkali metal bisulfate, and 8 to 10 parts by weight of water; and
   heating said second refractory material to cause hardening thereof.

2. A method according to claim 1, wherein said furnace is an electric furnace.

3. A method according to claim 2, wherein said second lining is formed by lining a portion of said wall area with a member selected from the group consisting of dolomite bricks and bricks of carbon-containing magnesium oxide.

4. A method according to claim 2, wherein said second lining is formed by lining a portion of said wall area with a water cooling box.

5. A method according to claim 4, wherein said water cooling box extends down said wall area to said first lining.

6. A method according to claim 1, wherein said second lining is formed by lining a portion of said wall area with magnesium oxide bricks and lining said magnesium oxide bricks and another portion of said wall area with a member selected from the group consisting of dolomite bricks and bricks of carbon-containing magnesium oxide.

7. A method according to claim 1, wherein said second refractory material is applied to said second lining in areas of said furnace to be subjected to heavier wear than other areas of said fur- nace.

8. A method according to claim 1, wherein said second refractory material is applied to said second lining by spraying.

9. A method according to claim 1, wherein said second refractory material is applied to said second lining by troweling.

10. A method according to claim 1, wherein said heating to cause hardening of said second refractory material is by means of operating said furnace.

11. A method according to claim 1, wherein said magnesium oxide contains at least 96% by weight of MgO.

12. A method according to claim 1, wherein said clay is bentonite.

13. A method according to claim 1, wherein said alkali metal in said metaphosphate, polyphosphate and bisulfate is sodium.

14. A method according to claim 1, wherein said furnace has a tapping spout and a pouring nozzle, and said second refractory material is applied to said tapping spout and pouring nozzle.

15. A method according to claim 14, wherein said second refractory material is applied to said tapping spout by ramming said material into said spout.

16. A method according to claim 1, wherein said first lining comprises bauxite bricks cemented together with an alumina-containing cement and bonded with a phosphate bonding agent.

17. A method according to claim 1, wherein said second refractory material comprises, by weight, 100 parts of said magnesium oxide, 1 to 3 parts of said green chromium oxide, 0.5 to 3 parts of said clay, 1 to 2 parts of said phosphate component, 0.2 to 1.5 parts of said bisulfate, and 8 to 10 parts of water.

18. A method according to claim 17, wherein said magnesium oxide has a C/S ratio of at least 1.5.

19. A method according to claim 17, wherein said green chromium oxide has a grain size below 0.063 mm.

20. A method according to claim 17, wherein said clay has an $Al_2O_3$ content of 30 to 40% by weight.

21. A method according to claim 1, wherein the maximum grain size of the solid components of said second refractory material is not greater than about 6 mm.

22. A method according to claim 21, wherein said solid components have a grain distribution of:

| mm | % by weight |
|---|---|
| 3–6 | 16–22 |
| 1 to <3 | 20–26 |
| 0.09 to <1 | 25–30 |
| <0.09 | 28–33 |

23. A method according to claim 1, wherein the maximum grain size of the solid components of said second refractory material is not greater than about 4 mm.

24. A method according to claim 1, wherein said metaphosphate has a $P_2O_5$ content of about 69%, and said polyphosphate has a polymerization degree of 4 to 30.

25. A method according to claim 1, wherein said second refractory material is applied to form a layer having a thickness of 30 to 100 mm on a dry basis.

26. A method according to claim 25, wherein said thickness is 40 to 60 mm.

27. A method according to claim 1, second refractory material is applied to overlap an upper portion of said first refractory material.

28. A steel-making furnace which comprises:
a wall area;
a bottom area;
a first lining of bricks on said bottom area;
a second lining of at least one member selected from the group consisting of bricks and a water cooling box on at least a portion of said wall area;
a first refractory material on said first lining and a lower portion of said second lining; and
a second refractory material on an upper portion of said second lining above said lower portion, said second refractory material being formed by applying to said upper portion, in a substantially clean state, a mixture comprising 100 parts by weight of magnesium oxide, 0.5 to 5 parts by weight of green chromium oxide, 0.5 to 3 parts by weight of clay, 0.5 to 3 parts by weight, in total, of at least one member selected from the group consisting of an alkali metal metaphosphate and a alkali metal polyphosphate, 0.2 to 1.5 parts by weight of an alkali metal bisulfate, and 8 to 10 parts by weight of water, and heating said mixture to cause hardening thereof.

29. A furnace according to claim 28, which is an electric furnace.

30. A furnace according to claim 29, wherein said second lining is a member selected from the group consisting of dolomite bricks and bricks of carbon-containing magnesium oxide.

31. A furnace according to claim 29, wherein said second lining is a water cooling box.

32. A furnace according to claim 31, wherein said water cooling box extends down said wall area to said first lining.

33. A furnace according to claim 28, wherein said second lining is formed by lining a portion of said wall area with magnesium oxide bricks and lining said magnesium oxide bricks and another portion of said wall area with a member selected from the group consisting of dolomite bricks and bricks of carbon-containing magnesium oxide.

34. A furnace according to claim 28, which has a tapping spout and a pouring nozzle, said second refractory material being applied to said tapping spout and pouring nozzle.

35. A furnace according to claim 28, wherein said first lining comprises bauxite bricks cemented together with an alumina-containing cement and bonded with a phosphate bonding agent.

36. A furnace according to claim 28, wherein said second refractory material forms a layer having a thickness of 30 to 100 mm on a dry basis.

37. A furnace according to claim 36, wherein said thickness is 40 to 60 mm.

38. A furnace according to claim 28, wherein said second refractory material overlaps an upper portion of said first refractory material.

* * * * *